US012095939B2

(12) United States Patent
Grubb et al.

(10) Patent No.: US 12,095,939 B2
(45) Date of Patent: Sep. 17, 2024

(54) TECHNIQUES FOR ESTABLISHING COMMUNICATIONS WITH THIRD-PARTY ACCESSORIES

(71) Applicant: Apple Inc., Cupertino, CA (US)

(72) Inventors: Jared S. Grubb, San Francisco, CA (US); Robert M. Stewart, San Jose, CA (US); Gabriel Sanchez, San Jose, CA (US); Zaka ur Rehman Ashraf, Pleasanton, CA (US); Anshul Jain, San Diego, CA (US)

(73) Assignee: Apple Inc., Cupertino, CA (US)

( * ) Notice: Subject to any disclaimer, the term of this patent is extended or adjusted under 35 U.S.C. 154(b) by 251 days.

(21) Appl. No.: 17/719,086

(22) Filed: Apr. 12, 2022

(65) Prior Publication Data

US 2022/0337691 A1 Oct. 20, 2022

Related U.S. Application Data

(60) Provisional application No. 63/175,480, filed on Apr. 15, 2021.

(51) Int. Cl.
*H04M 1/27* (2006.01)
*G10L 15/08* (2006.01)
(Continued)

(52) U.S. Cl.
CPC ............. *H04M 1/271* (2013.01); *G10L 15/08* (2013.01); *G10L 15/22* (2013.01); *G10L 15/30* (2013.01);
(Continued)

(58) Field of Classification Search
CPC ..... H04M 1/271; H04W 76/15; H04W 88/04; G10L 15/08; G10L 15/22; G10L 15/30; G10L 2015/088; G10L 2015/223
See application file for complete search history.

(56) References Cited

U.S. PATENT DOCUMENTS 11,924,254 B2 * 3/2024 Hansen ................... H04L 67/12
2006/0031612 A1 2/2006 Bashford et al.
(Continued)

FOREIGN PATENT DOCUMENTS

CN 117136352 A * 11/2023 .......... G06F 11/3041
CN 110308886 B * 3/2024 ............ G06F 3/041
(Continued)

OTHER PUBLICATIONS

Application No. PCT/US2022/024531, International Search Report and Written Opinion, Mailed On Jul. 18, 2022, 16 pages.

*Primary Examiner* — Adam D Houston
(74) *Attorney, Agent, or Firm* — Kilpatrick Townsend & Stockton LLP

(57) ABSTRACT

Techniques are disclosed for connecting third-party accessories to a cellular-capable device to participate in a telephone call. In one example, a user can voice a request to make a call to an accessory device. The accessory device can transmit the request to a controller device. Upon processing the request, the controller device can identify an appropriate cellular-capable device and instruct the cellular-capable device to place the requested call. The controller device can also instruct the cellular-capable device to establish an audio connection with the accessory device to relay the call audio. In another example, the controller device can listen for a word spoken at the accessory device indicating the end of the call. Upon receiving the end of call word, the controller device can instruct the cellular-capable device to terminate the call. While in the listening state, the controller device may continue processing user requests received at other accessory devices.

20 Claims, 8 Drawing Sheets

(51) Int. Cl.
    *G10L 15/22*     (2006.01)
    *G10L 15/30*     (2013.01)
    *H04W 76/15*     (2018.01)
    *H04W 88/04*     (2009.01)

(52) U.S. Cl.
    CPC ....... *H04W 76/15* (2018.02); *G10L 2015/088* (2013.01); *G10L 2015/223* (2013.01); *H04W 88/04* (2013.01)

(56) References Cited

U.S. PATENT DOCUMENTS

| | | |
|---|---|---|
| 2015/0195357 A1 | 7/2015 | More et al. |
| 2016/0378950 A1 | 12/2016 | Reiner |
| 2017/0160952 A1 | 6/2017 | Nakanishi et al. |
| 2018/0240456 A1* | 8/2018 | Jeong ................ G10L 15/22 |
| 2019/0081810 A1 | 3/2019 | Jung |
| 2019/0213156 A1 | 7/2019 | Goyal |
| 2020/0051558 A1 | 2/2020 | Yeon et al. |
| 2021/0375279 A1* | 12/2021 | Lee ................ G10L 15/28 |
| 2022/0093105 A1* | 3/2022 | Choi ................ G10L 15/32 |
| 2022/0335938 A1* | 10/2022 | Grubb ................ G06F 3/165 |
| 2022/0337691 A1* | 10/2022 | Grubb ................ G10L 15/30 |
| 2023/0035128 A1* | 2/2023 | Barscevicius ........... G10L 15/22 |
| 2023/0082944 A1* | 3/2023 | Ren ................ G10L 15/005 704/254 |
| 2023/0113883 A1* | 4/2023 | Carbune ................ G10L 25/78 704/235 |
| 2023/0397269 A1* | 12/2023 | Turner ................ H04L 67/51 |

FOREIGN PATENT DOCUMENTS

| | | |
|---|---|---|
| KR | 20230165061 A * | 12/2023 |
| WO | 2019231537 A1 | 12/2019 |

* cited by examiner

TECHNIQUES FOR ESTABLISHING COMMUNICATIONS WITH THIRD-PARTY ACCESSORIES

CROSS-REFERENCES TO RELATED APPLICATIONS

This application claims priority under 35 U.S.C. § 119(e) to: U.S. Provisional Application No. 63/175,480, filed on Apr. 15, 2021, the contents of which are herein incorporated by reference.

BACKGROUND

Techniques exist for multiple devices in a home environment to communicate among the multiple devices. For example, a user can interact with a device that provides a digital assistant program. This device, via the digital assistant, can communicate with other devices to perform requests from the user, including controlling smart accessory devices such as light switches, speakers, and thermostats. However, controlling smart device functionality has continued challenges. A user may want to make a phone call from an accessory device. The accessory device can relay the request to a user device with a device assistant, but that device may not be capable of cellular communication. Accessory devices may also be produced by various manufacturers. However, various challenges exist with managing these accessory devices.

BRIEF SUMMARY

Embodiments of the present disclosure can provide methods, systems, and computer-readable media for providing communication between an accessory device and a cellular-capable device. In some examples, a controller device can receive a call request from the accessory device and select an appropriate cellular-capable device to make the call. The cellular-capable device can then establish an audio connection with the accessory device to relay the call audio to and from the accessory device.

According to one embodiment, a method may be executed by a computer system within a home environment. The computer system can be a user device such as a smartphone, a tablet, a smart television (TV) media streaming device, a smart hub speaker, or the like. The user device may receive a call request from an accessory device present within the home environment. The user device can then select a cellular-capable device within the home environment to place the call and connect to the accessory device. The selection can be based on a determination of which cellular-capable devices are associated with the user making the call request.

In some embodiments, one or more accessory devices can be associated with a user device. The user device may implement an instance of one or more processes or other applications corresponding to the associated accessories. The instance can be a device assistant application or other processes for analyzing human speech or other audio signals. The collection of processes in each instance may correspond to a software ecosystem on the user device.

In another embodiment, when an accessory device participates in a call with a cellular-capable device, the user device can enter a call listening state. While in the call listening state, the instance corresponding to the accessory device can have speech processing capabilities limited to only detecting an end word. In other embodiments, an interaction instance corresponding to other accessories associated with the user device may not be limited while a first accessory device is participating in a call. The other instances may receive and process user requests from the other accessories as per the normal operation of the accessories and user device when a call is not in progress.

DETAILED DESCRIPTION OF THE EMBODIMENTS

Figure 1:
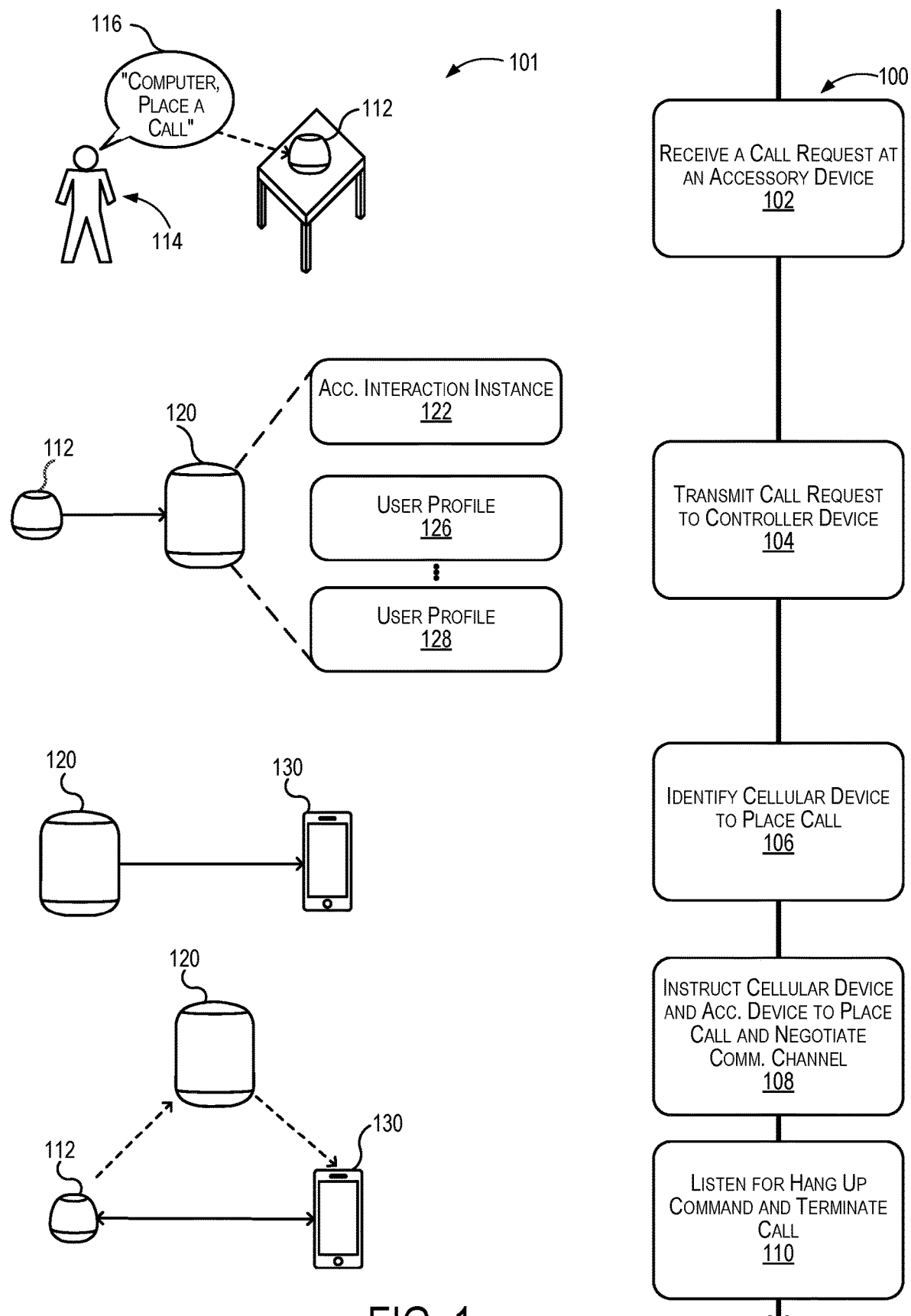
FIG. 1 is a simplified block diagram of an example process, according to some embodiments.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Embodiments of the present disclosure can provide techniques for establishing communications between accessory devices and cellular-capable devices. As a first example, consider a home environment corresponding to a home. A person within the home may want to make a telephone call using a voice command. The person may make a verbal request (e.g., "Computer, call Mom") to an accessory device (e.g., a third-party accessory that is not manufactured or designed by the same entity that manufactured or designed a home device (e.g., a hub) or a cellular-capable device (e.g., a smart phone)). The accessory device can determine that the request was intended for the device and then transmit the received audio information to the hub device (e.g., a hub speaker). The hub device can process the audio information to determine the nature of the request and prepare a corresponding response (e.g., connect to the cell phone to place the call). Alternatively, or partly in combination with the above, the hub device may transmit some or all of the verbal request to a server computer (e.g., implementing a service provider), where the service provider can determine the nature of the request and/or prepare a corresponding response. The hub device can then communicate with the cellular-capable device to instruct the cellular-capable device to place the call and to establish a separate audio communication channel with the accessory. The hub device can then enter into a listening state to listen for a request from the user to end the phone call (e.g., "Computer, hang up."). When the hub device receives the hang-up request, it can send instructions to the accessory device to terminate the call. The accessory device can then transmit information to the cellular-capable device to end the call.

As an illustration of the example above, the home environment can include numerous "smart" devices, e.g., electronic devices with features allowing them to operate, to some extent, interactively and autonomously. The smart devices can have various functionality, including cameras, speakers, thermostats, headphones and headsets, phones, or media players. The smart devices can also have various network communication capabilities, including WiFi, Ethernet, Bluetooth, Zigbee, cellular, and the like. The devices can be produced by various manufacturers. In some instances, the smart devices may be categorized into hub devices and accessory devices. A hub device can be a resident device of the home (e.g., a smart speaker, a smart digital media player configured to control a television (TV), a mobile phone, etc.). While not always, in some examples, a resident device may be expected to reside within the home and not move (e.g., within the home or to outside of the home) often. A hub device can have capabilities equal to or exceeding the capabilities of an accessory device. For example, a hub device can be a mobile phone, which can include wireless (e.g., WiFi) and cellular communications capabilities, multimedia capabilities, and a device assistant. In this same example, an accessory device can be a smart speaker, which can include audio media and wireless communications capabilities but lack a device assistant. A device assistant can be a virtual assistant program configured to interact with a user. In these examples, depending on its capabilities, a smart speaker can be either a hub device or an accessory device. In some examples, if an accessory is manufactured by an entity different from the entity that manufactured the hub devices, the accessory may not initially be configured with the ability to communicate with the user devices. In some instances, the hub device manufacturer may provide an accessory development kit ("ADK") for installation on the accessory that enables such communication either after the accessory is manufactured, sold, provisioned, or used. A controller device can be a hub device as described herein, and may include user interface features. In some embodiments, the controller device is a leader device selected from among the hub devices in the home environment. As used herein, the terms hub device, user device, leader device, and controller device can indicate one or more similar devices distinguished from the accessory devices. A cellular-capable device can be any device associated with the home environment that is capable of connecting to a cellular network. The cellular-capable device can be a hub device or an accessory device, in some embodiments.

In some embodiments, the hub device can obtain information about the accessory devices present in the home environment. This information can be obtained by the hub device communicating directly with accessory devices sharing the same network within the home environment. In other embodiments, information about accessory devices can be sent to the hub device by a second hub device, a user device configured as a leader device, or a remote server device (e.g., a service provider). For example, a user in the home may add a new accessory device to the home environment. As part of this process, the user can interact with a second hub device (e.g., a mobile phone) to configure the new accessory device and send the new accessory device information to the first hub device. As another example, a leader device in the home environment can have information about a plurality of accessory devices in the home environment and report information about some or all of the accessory devices to the hub device. The hub device can then use the information to form an association with the corresponding accessory devices. The accessory information may be stored by the hub device.

The hub device can associate with a plurality of accessory devices by creating an accessory interaction instance for each accessory device. The interaction instances can be software modules or processes configured to perform tasks at the hub device. In some embodiments, the interaction instances can each implement and/or communicate with a device assistant. For example, a hub device can receive information about an accessory smart speaker and a smart thermostat located in the home environment. The hub device can create two interaction instances corresponding to a device assistant, one for each of the smart speaker and the smart thermostat. The interaction instances can be duplicates of the device assistant in some embodiments, while in other embodiments the instances can be a collection of modules including the device assistant and other processes for carrying out tasks on the hub device. The interaction instances can comprise different modules or processes depending on the associated accessory and its capabilities. It should be understood that any suitable combination of processes running on the hub device can be included in an interaction instance corresponding to an accessory device.

Continuing with the first example above, a user may voice a request to an accessory. For example, the user may speak into the microphone of a nearby smart speaker (or thermostat, light bulb, etc.), "Computer, call Mom?" In this example, the request ("call Mom") may correspond to a portion of the of the user's audio input into the smart speaker. The opening phrase ("Computer") may correspond to a different portion of the user's audio input and can be a trigger or wake word. In some embodiments, the smart speaker may perform speech recognition processing on the wake word. Based on the processing, the smart speaker can determine if the user's speech was intended to be a request or command to which the speaker should respond. If so identified, the smart speaker can then transmit the user audio to a hub device running an accessory interaction instance corresponding to the smart speaker. In some embodiments, the accessory device can store a copy of the audio input temporarily for transmission to the user device after processing the wake word portion. In other embodiments, upon processing the wake word portion of the audio input, the accessory device can establish a streaming audio connection with the hub device to relay the portion of the user's audio input that follows the wake word. In these embodiments, the accessory device can transmit a stored copy of the wake word portion of the audio input to the hub device for additional processing.

Upon receiving an audio input from the smart speaker, the hub device can perform additional processing on both the wake word portion of the audio input and the portion corresponding to a request or command. For example, the hub device can perform natural language processing ("NLP") on the wake word. Based on this wake word processing, the hub device can then process the portion of the audio corresponding to the request. If the hub device determines that the wake word portion was not, in fact, an accurate wake word, it can ignore the remaining portion of the audio or terminate the audio stream from the accessory. In some embodiments, the speech processing module on the hub device can be part of the accessory interaction instance. The interaction instance can also transmit all or a portion of the audio input to another device for analysis (e.g., to a service provider device). This service provider device can be a remote server computer or cloud device that can perform speech processing and parse the request for an appropriate response. In some cases, the hub device performs the processing of the wake word while the remaining portion of the audio is processed remotely. However, in other examples, the hub device can handle all the processing. Parsing the request includes determining the content and context of the user's spoken audio and providing a response for the hub device to take action on. In the current example, the response could be to communicate with a cellular-capable device to place a call to Mom, which can be performed by the hub device using an appropriate process or by the remote server device, or combination of the two devices. In some embodiments, the hub device can relay instructions for establishing the call, including the identity of the selected cellular-capable device, to the accessory device. The accessory device can then establish communications with the cellular-capable device and send instructions to place the call. In another example, the hub device can relay instructions for establishing the call, including the identity of the accessory device, to the cellular-capable device, and then the cellular-capable device can establish communications with the accessory device and then place the call. Calling Mom can include accessing user information that identifies "Mom" within the context of the user making the request, for example by identifying the user and then accessing that user's contacts information. Mom's phone number can then be obtained and sent to the cellular-capable device.

Once a response has been determined, the hub device can execute that response. This can include identifying a cellular-capable device and sending it instructions to place a call. The instructions can include information identifying the call recipient, including a phone number to dial out or a recipient's identity stored locally at the cellular-capable device to provide the phone number at the cellular-capable device. For example, in one embodiment, the hub device can obtain Mom's phone number as part of processing of the audio request and then instruct the cellular-capable device to dial that number. In another embodiment, the hub device can instruct the cellular-capable device to call "Mom" and let the cellular-capable device obtain the number using its own information about the identity of Mom. This latter embodiment is applicable in instances where the hub device can identify a cellular-capable device corresponding to the user making the call request, but is unable to access contacts information for that user, for example if the contacts are only stored at the cellular-capable device. The preparation and execution of the response can take place in the interaction instance corresponding to the accessory. A response that requires a particular action (e.g., placing the phone call) can be delegated as appropriate from the interaction instance to another process on the hub device or to another device with which the hub device can communicate.

The hub device can also communicate with the accessory device to identify the cellular-capable device that is placing the call and instruct the accessory to establish a communications channel with the cellular-capable device. The communications channel can be a real time audio connection using Real-time Transport Protocol ("RTP") or other suitable method. The audio channel can be used to send and receive audio between the accessory device and the cellular-capable device. In some embodiments, the accessory device can establish a second communications channel with the cellular-capable device to send phone control instructions to the cellular-capable device. These phone control instructions can be instructions to end the call based upon the accessory receiving information from the hub device that the user has requested to end the call. In some embodiments, the second communications channel can also be used by the accessory device to send instructions to the cellular-capable device to initiate the call in instances where the hub device does not communicate the call instructions directly to the cellular-capable device.

Once the call has been established, the hub device can enter a call listening state at the accessory interaction instance corresponding to the accessory device. When in the call listening state, the hub device only listens for a "hang up" or "end call" or other similar command from the accessory device indicating that the user wishes to terminate the phone call. In this way, the device assistant and other processes associated with that accessory interaction instance do not inadvertently capture, record, or process audio information from the phone call. As an example, at the conclusion of the phone call, the user can say "Computer, hang up." As with the call request described above, the "Computer" portion of this command can correspond to a wake word that indicates to the accessory device that the audio that follows the wake word may be a user command and not a part of phone conversation. The phrase "hang up" can be an end word. When in the call listening state, the accessory can receive the audio corresponding to the wake word and the end word. The wake word will be processed as with other wake words described herein. If the wake word is detected, then the accessory interaction instance can process the end word. Because the hub device is in the call listening state, the end word processing can be more limited than audio processing for other user requests received. For example, the accessory interaction instance may perform the end word detection locally without transmitting the audio to a remote service provider for NLP. In some embodiments, when in the call listening state, the accessory interaction instance at the hub device may only process a limited portion of an audio input following a wake word, such that the accessory interaction instance only receives a short piece of audio sufficient to contain an end word like "hang up" or "end call." In this way, the accessory interaction instance does not capture user audio that does not correspond to an end word.

The call listening state can be, in some embodiments, a state of the particular accessory interaction instance associated with the accessory device connected to a call. Other accessory interaction instances present at the hub device can function normally and may not be limited by the call listening state. For example, continuing with the user call above, the user may be on a phone call with Mom using the smart speaker. A second user in the home may make a request to the smart thermostat also associated with the hub device (e.g., "Computer, turn the heat up to 72° F."). The accessory interaction instance corresponding to the smart thermostat may not be in the call listening state and can process this second user request normally, instructing the thermostat to change its temperature set point in accordance with the request. This allows the hub device to retain its accessory management functionality while ensuring the data privacy of the first user and the external call recipient.

FIG. 1 is a simplified block diagram of an example embodiment. The process 100 is an example high-level process flow for a system that includes an accessory device 112 that can receive a call request and establish communications with a cellular-capable device 130 via a controller device 120. The diagram 101 shows states of the system that correspond to the blocks of the process 100. The process 100 can be performed within a home environment containing multiple accessory devices, hub devices, and cellular-capable devices. As depicted here, the accessory device 112 can be a smart speaker while the controller device 120 can be a hub speaker. Although described as being a particular device, it should be apparent that the accessory device 112 and the controller device 120 can be several types of smart devices in various combinations and number. For example, a smartphone, media device (e.g., a smart TV), or tablet (either connected to a cellular network, to a local area network via WiFi of a home network, or to a wide area network ("WAN")) can perform one or more of the operations of the process 100.

Turning to the process 100 in more detail, at block 102 the accessory device 112 can receive a call request 116 from a user 114. In some embodiments, the call request 116 can contain a portion of audio corresponding to the request (e.g., "place a call") and a second portion corresponding to a wake word (e.g., "Computer"). The wake word need not be a single word and can be a word or phrase that signals to the system that the user has or is about to voice a request, command, or other audible interaction to the system. Upon receiving input containing a wake word, the accessory 112 can process that portion of the call request 116 at a first level to determine the presence of the wake word. The first level processing can be done in a time and resource efficient manner that determines that the wake word may be present. For example, the accessory 112 can perform voice pattern matching using stored voice patterns corresponding to users speaking the wake word. The stored patterns can be associated with the users in a home environment containing the system or can be generic patterns that are applicable to a large number of possible users. In this way, the accessory device 112 is not burdened with sophisticated speech detection processes but also does not respond to every extraneous audio input received by users or other sources in its vicinity.

Moving down to block 104, upon detecting the wake word, the accessory device 112 can transmit the received call request 116 to the controller device 120 where it will be processed. As illustrated, the smart speaker 116 has a corresponding accessory interaction instance 122 on the controller device 120, such that the accessory interaction instance 122 manages the processing of the call request 116 received from the smart speaker 112. The accessory interaction instance 122 can contain modules configured to process the call request 116. For example, accessory interaction instance 122 can include a speech detection module that can analyze the portion of the call request 116 that corresponds to the wake word. This analysis can be at a second level that can confirm the presence of the wake word to a higher degree of probability than the wake word detection at the smart speaker 112. In addition, in some embodiments, the speech detection module can determine a user's language and perform the wake word detection based on the determined language. If the speech detection module of the accessory interaction instance 122 does not detect the wake word, the controller device 120 can ignore the audio input.

The controller device 120 may also have access to user profiles 126, 128. The user profiles 126, 128 may be stored at the controller device 120 or another device like a server device. The user profiles 126, 128 can correspond to users within the home environment and comprise information that can be used to identify one or more cellular-capable devices associated with the users. For example, user profile 126 can correspond to user 114 and may identify that cellular-capable device 130, depicted as a smartphone, is associated with user 114. When processing the call request 116, the accessory interaction instance 122 may identify user 114 as having made the call request 116 and access user profile 126 to determine an appropriate cellular-capable device to execute the call. Moreover, the user profile 126 can also comprise information related to potential recipients of the call. For example, the user profile 126 can include the user's 114 contacts list. The accessory interaction instance 122 can use the contacts information when parsing the call request, for example to determine a dial-out phone number for the cellular-capable device 130 to call when executing the call request 116. In some embodiments, the user profiles 126, 128 can be stored at a remote server or other device and can be accessed by a remote service provider used to process the call request.

Moving to block 106, the controller device 120 can process the call request to identify a cellular-capable device 130 to place the call. As described above with reference to block 104, the controller device 120 may access user profiles 126, 128 to determine an appropriate cellular-capable device 130.

At block 108, the controller device 120 can instruct the cellular-capable device 130 to place the call corresponding to the call request. In some embodiments, this can include determining a dial-out number for the cellular-capable device 130 to dial when making the call. In other embodiments, the controller device 120 can instruct the cellular-capable device 130 to place the call based upon a label or other identifier contained within the call request 116 (e.g., "Mom," "the office," etc.). In addition to sending instructions to the cellular-capable device 130, the controller device 120 can instruct the accessory device 112 to establish a communications channel with the cellular-capable device 130. This communications channel can be a real-time audio channel to send and receive the audio during the call.

At block 110, the accessory interaction instance 122 at controller device 120 can enter a call listening state to listen for a hang up command (e.g., "Computer, end call"). The hang up command can consist of a portion corresponding to a wake word (e.g., "Computer") and a portion corresponding to an end word (e.g., "end call" or "hang up"). As with the wake word, the end word need not be a single word and can be any word or phrase identified to indicate the end of a phone call. When the user 114 issues the hang up command, the accessory 112 may process the wake word at the first level as described above with respect to block 102. If the wake word is detected, the accessory 112 can send the audio of the hang up command to the controller device 120. The controller device 120 can process the wake word at the second level as described with respect to block 104. Upon confirming that the wake word is present, the accessory interaction instance 122 can process the end word portion of the hang up command. Processing the end word can be performed in a limited manner, so that controller device 120 does not receive or process additional audio information potentially captured from the ongoing phone call at the accessory device 112. If the end word is detected, the controller device 120 can transmit instructions to the accessory device 112 to terminate the call. The accessory device 112 can then issue a hang up command to the cellular-capable device 130 to close the cellular connection at cellular-capable device 130. Alternatively, in some embodiments, the controller device can instruct the cellular-capable device 130 both to end the call directly and to transmit an indication to the accessory 112 that the call has been successfully terminated.

Figure 2:
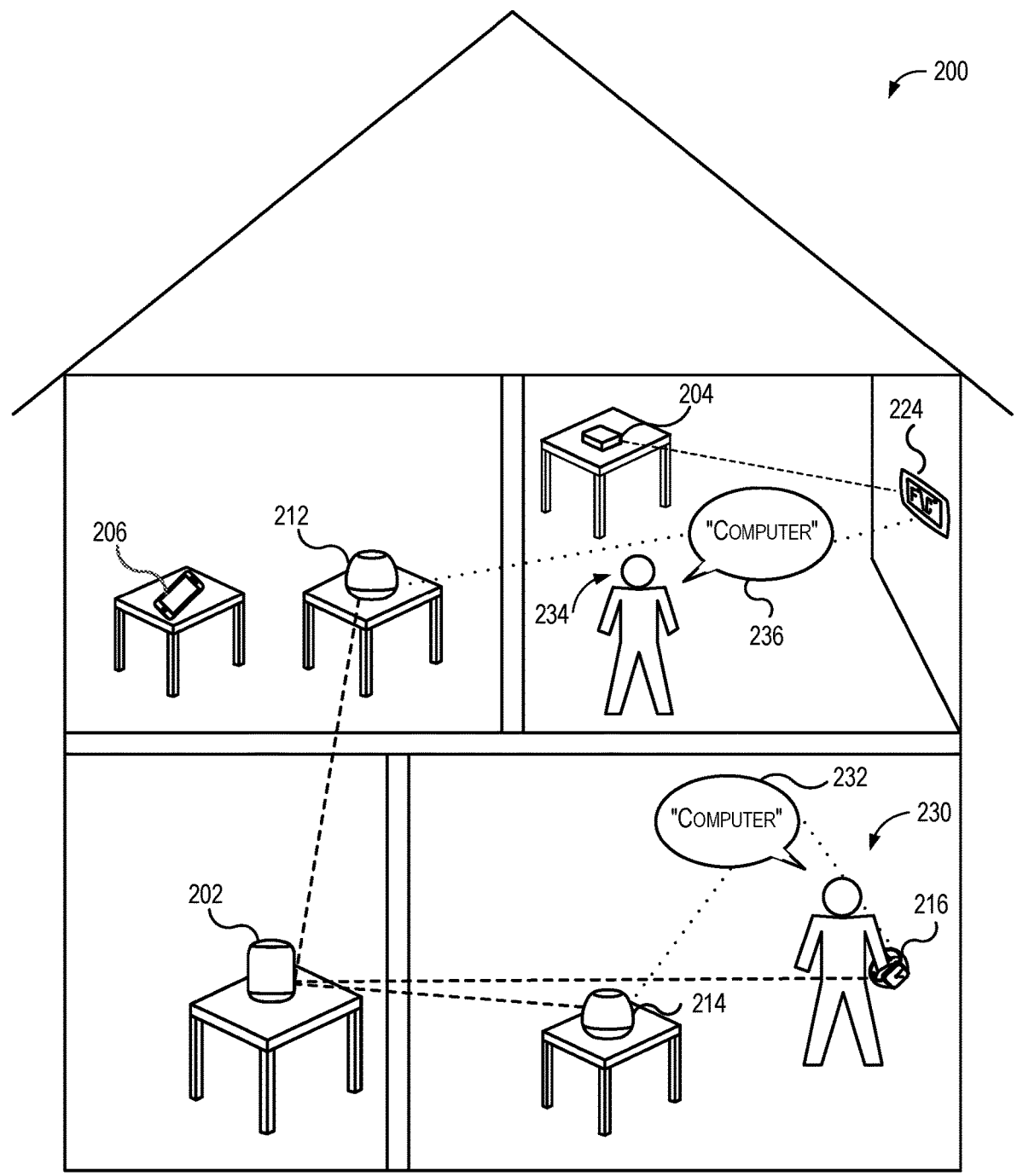
FIG. 2 is a schematic of a home environment containing user devices and accessory devices, according to some embodiments.

FIG. 2 is a schematic of a home environment containing hub devices, accessory devices, and cellular-capable devices, according to some embodiments. Hub devices can include a hub speaker 202 and a media player 204. These hub devices can correspond to controller device 120 from the embodiments described above with respect to FIG. 1. The smartphone 206 can be a cellular-capable device such as the cellular-capable device 130 of FIG. 1. In several embodiments, the smartphone 206 can act as a hub device. Accessory devices can include smart speakers 212, 214, a smartwatch 216, and a thermostat 224. Similarly, these accessory devices can correspond to accessory device 112 described with respect to FIG. 1. All or some of these accessory devices may be third-party devices (e.g., not manufactured, programmed, or provisioned by the manufacturer, programmer, or provisioner of the hub devices or user devices). Because of this, they may not be automatically and/or initially compatible with the user devices. Each hub device in the home environment 200 can be associated with zero, one, or more accessory devices. As illustrated by the long-dashed lines, hub speaker 202 is associated with smart speakers 212, 214 and smartwatch 216 while media player 204 is associated with thermostat 224. The smartphone 206 is not associated with an accessory device. The devices within the home environment 200 can be configured to communicate using one or more network protocols over one or more networks associated with the home environment 200. For example, the home environment 200 can be associated with a local area network ("LAN"), a WAN, a cellular network, a personal area network, or other network, and the devices can communicate using a WiFi connection, a Bluetooth connection, a Thread connection, a Zigbee connection, or other communication method.

The arrangement of associations of accessory devices with hub devices can include various different combinations and can be modified by another device associated with the home environment, for example one of the hub devices or a user device. For example, a user device can associate a new accessory device to one of the hub devices in the home. In some embodiments, the assignment of accessory devices to hub devices can be based on a scoring algorithm applied by the user device. The user device can also use this scoring algorithm to transfer existing accessory devices from one hub device to another. This transfer can occur automatically based on information that the hub device receives about the home environment 200, including, but not limited to, information that another hub device may be more suitable for association with one or more accessories or that accessories have been added to or removed from the home environment 200. When an accessory is assigned to or associated with a hub device, the hub device can create an accessory interaction instance corresponding to each assigned accessory. Thus, the hub device can comprise a unique software ecosystem for each assigned accessory. The suitability of any particular hub device to associate with an accessory can be based at least in part on the capabilities of the hub device, the capabilities of the accessory device, the current processing load experienced by the hub device, the locations of the devices within the home environment, and the status of communications between the devices on a network. Many other criteria for rearranging device associations in a home environment are contemplated.

In some embodiments, non-resident accessory devices and hub devices may also leave the home environment or lose network connectivity with the home environment. An accessory device that leaves the home environment can be disassociated by the previously associated hub device. Accessory devices associated with a hub device that loses network connectivity with the home environment can be reassigned by another hub device that retains network connectivity. In this case, the other hub device can receive information that the hub device is no longer able to communicate with the accessory device and reassign the accessory device. Some embodiments may have a hub device designated a leader device to manage the assignment of accessory devices among the hub devices within the home environment. In other embodiments, if hub devices and accessory devices are associated and leave the home environment and lose network connectivity, the hub devices can retain their associations with the accessory devices and perform the embodied methods described herein.

As a hub device, smartphone 206 can communicate with the other hub devices within the home environment, including receiving accessory assignments from a user device or leader device. As such, the other hub devices can communicate with smartphone 206 to instruct it to place calls over a cellular network in response to a user call request. In some embodiments, smartphone 206 may not be capable of acting as a hub device but remains known to the hub devices, user devices, or a leader device within the home such that call requests can be transmitted to the smartphone 206 as a cellular-capable device. In other embodiments, the smartphone 206 may be identifiable by a remote device (e.g., a server device in communication with one or more of the networks associated with the home environment).

Continuing with FIG. 2, a home environment 200 can have multiple users 230, 234 making audio requests 232, 236 of accessories. The requests 232, 236 can occur separately or simultaneously and can be received by multiple accessory devices as depicted by the short-dashed lines. For example, request 232 can be received by smart speaker 214 or smartwatch 216, while request 236 can be received by smart speaker 212 and thermostat 224. As described previously, the arrangement of accessory devices and their associations can take various forms and can change over time. Thus, a user request may be received by multiple accessory devices associated with different hub devices. For example, user request 236 is received by both thermostat 224 associated with media player 204 and by smart speaker 212 associated with hub speaker 202. As depicted, depending on their location in the home, user 230 and user 234 may not have direct access to a cellular-capable device to make a phone call. Moreover, each hub device may be assigned to more than one accessory device. The ability to pair an accessory device with a cellular-capable device, via the corresponding accessory interaction instance, to make a call allows the hub device to continue managing the functionality of other accessory devices while maintaining data privacy with regard to the ongoing call.

As a specific example of the foregoing embodiments, consider the case where user 230 makes a call request 232. The receiving accessories, smart speaker 214 and smartwatch 216, may lack cellular communications capabilities. Likewise, hub speaker 202 may not be a cellular-capable device. In some embodiments, accessory devices can coordinate with other accessory devices within the home environment 200 to determine which accessory device should respond to a user request that is received by one or more accessory devices. For the purposes of this example, consider the case where smart speaker 214 is the accessory device selected to process the call request 232. Upon receiving the request 232 and detecting the wake word, the smart speaker can transmit the request 232 to hub speaker 202. Hub speaker 202 can process the call request 232 and identify that smartphone 206 is the appropriate cellular-capable device for executing the call. Hub speaker 202 can then instruct smartphone 206 to place the call and establish a communications channel with smart speaker 214 for relaying the call audio. Alternatively, in some embodiments, the hub speaker 202 can instruct the smart speaker 214 to communicate with the smartphone 206 to establish the call. The accessory interaction instance associated with smart speaker 214 at hub speaker 202 can then enter a call listening state and listen for user 230 to speak the end word at smart speaker 214.

Continuing the above example, consider user 234 making user request 236 to ask what the current time is (e.g., "Computer, what time is it?") during the time that user 230 is conducting the phone call at smart speaker 214. The request 236 may be received by smart speaker 212, which is associated with hub speaker 202. Despite the accessory interaction instance associated with smart speaker 214 at hub speaker 202 being in the call listening state, the accessory interaction instance associated with smart speaker 212 is not in a restricted state and can process the request 236 normally and relay a response to smart speaker 212 (e.g., "It is 10:30 p.m.).

Figure 3:
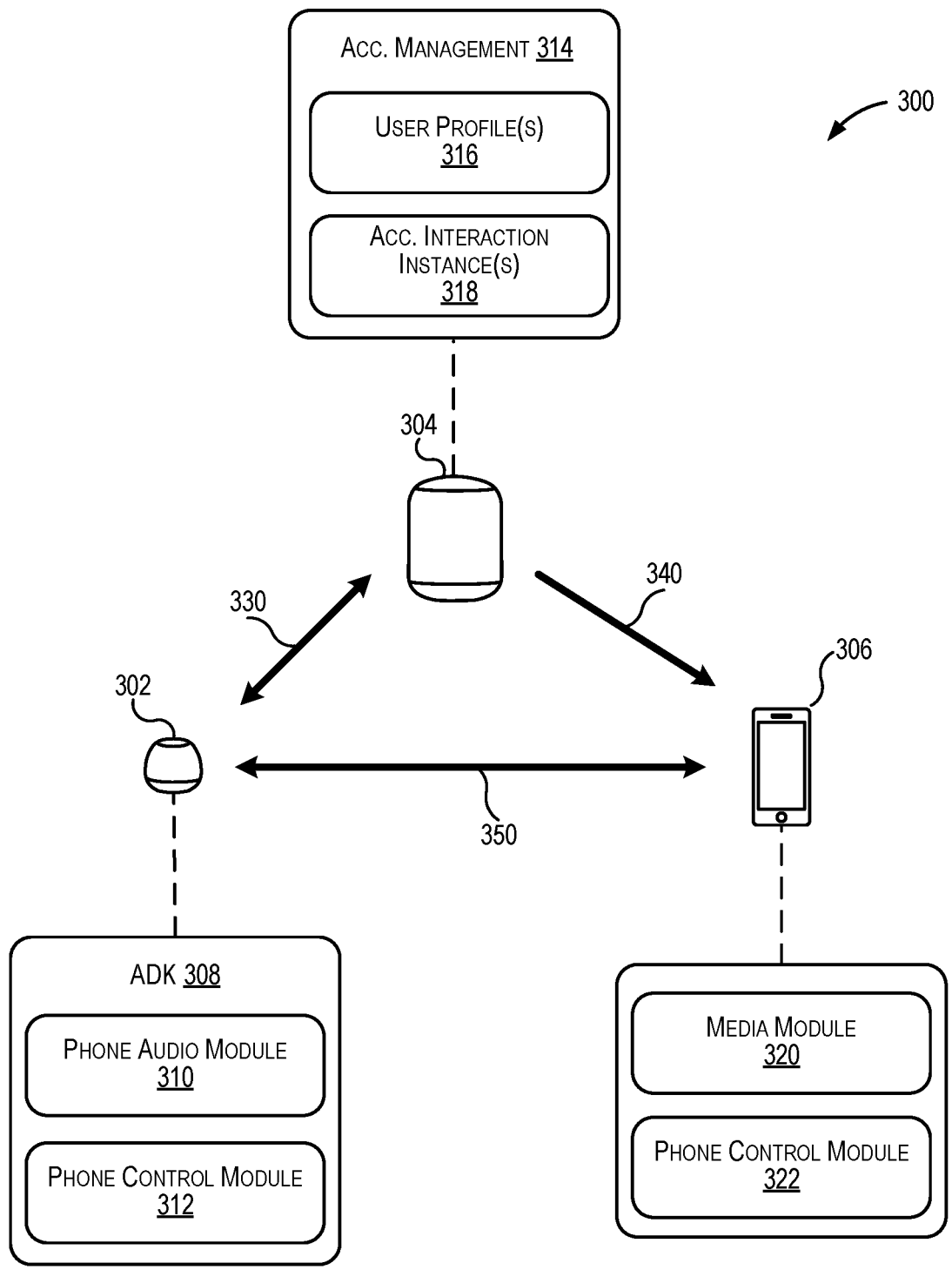
FIG. 3 is another simplified block diagram illustrating at least some methods of establishing communications between an accessory device and a cellular-capable device, according to some embodiments.

FIG. 3 is another simplified block diagram illustrating a process 300 of establishing communications between an accessory device and a cellular-capable device, according to some embodiments. In some embodiments, the accessory device 302 can correspond to accessory devices described herein (e.g., accessory device 112 of FIG. 1). Similarly, a controller device 304 can correspond to other controller devices or hub devices and the cellular-capable device 306 can correspond to other cellular-capable devices as described herein. Controller device 301, depicted here to be a hub speaker, can be a hub device, a leader device, a configuration device, or other device used to determine an appropriate cellular-capable device 306 to place a call and direct the accessory device 302 to connect to the cellular-capable device 306. The controller device 301 can be configured to communicate with other hub devices, the accessory device 302, other accessories, and cellular-capable device 306 over one or more networks described herein, including a LAN or a WAN.

Multiple elements of the connection process 300 are presented in more detail. The accessory device 302 can comprise an ADK 308. The ADK 308 can be a software development kit ("SDK") stored and configured to be executed or processed on the accessory device 302. As used herein, an SDK can include application programming interfaces and related software libraries sufficient to enable the operation of other software within or associated with the SDK. In some embodiments, the ADK 308 can be provided by an entity associated with the controller device 304 (e.g., its manufacturer). The ADK 308 can include a phone audio module 310 and a phone control module 312. The phone audio module 310 can establish a real-time audio connection with the cellular-capable device 306 to send and receive audio during a phone call. The phone control module 312 can send and receive instructions and indications to and from the cellular-capable device 306 corresponding to the device control of the phone connection. In some embodiments, the phone control module 312 can, upon receiving a hang-up instruction from the controller device 304, send a signal to the cellular-capable device 306 to terminate the cellular connection to end the call.

The controller device 304 can comprise an accessory management module 314, which can be a software process running on the controller device 304. The accessory management module 314 can, in some embodiments, receive, process, store, update, and transmit accessory management settings. For a particular user device, its accessory management settings can include a list of all accessories assigned to that controller device and other information related to the capabilities of those assigned accessories. The accessory management module can comprise user profile(s) 316. These profile(s) 316 can correspond to one or more users within a home environment and may contain information associating each user with one or more cellular-capable devices, including cellular-capable device 306. The user profile(s) 316 may also comprise information identifying one or more contacts or other information that can be used by the controller device 304 to respond to a call request and direct the establishment of a call. The accessory management module 320 can also comprise accessory interaction instance(s) 318. The accessory interaction instance(s) 318 can be created by the controller device 304 for each accessory assigned to the controller device 304. Each of the accessory interaction instance(s) 318 may represent one or more distinct software ecosystems on the controller device. For example, the accessory interaction instance corresponding to accessory device 302 may represent a first software ecosystem of the controller device while another accessory interaction instance corresponding to another accessory device may represent a second software ecosystem of the controller device.

The cellular-capable device 306 can comprise a media module 320 and a phone control module 322. The media module 320 can, in some embodiments, send and receive media data, including phone audio, over one or more cellular networks to which the cellular-capable device 306 can connect. The media module 320 can also connect to the accessory device 306 via a real-time audio or other channel through which the cellular-capable device 306 can send and receive audio data corresponding to the phone audio. The phone control module 322 can send and receive instructions and indications to and from the accessory device 302 corresponding to the device control of the phone connection. In some embodiments, the phone control module 322 can, upon receiving instructions from the controller device 304, place a phone call by dialing a selected phone number or accessing contact information stored locally at the cellular-capable device and dialing a phone number associated with the contact information.

Completing the detailed elements of FIG. 3, process indicators 330, 340, 350 represent data transmission between the accessory device 302 and the controller device 304, the controller device 304 and the cellular-capable device 306, and the accessory device 302 and the cellular-capable device 306, respectively. The process indicators 330, 340, 350 can indicate communication over one or more networks between the various devices as described herein, including, but not limited to, a WiFi LAN, an Internet WAN. Process indicator 330 indicates, in some embodiments, transmission of data corresponding to a user request to place a call at the accessory device 302 and a subsequent response from the controller device 304 providing an indication that the request was successfully processed. Similarly, process indicator 340 indicates transmission of data including instructions to the cellular-capable device 306 to place a call in response to the user request. In some embodiments, the cellular-capable device 306 does not transmit any corresponding data or information back to the controller device 304. Process indicator 350 indicates transmission of data including the real-time audio of the phone call and phone control instructions or indications, including instructions to establish or terminate a call according to some embodiments.

Figure 4:
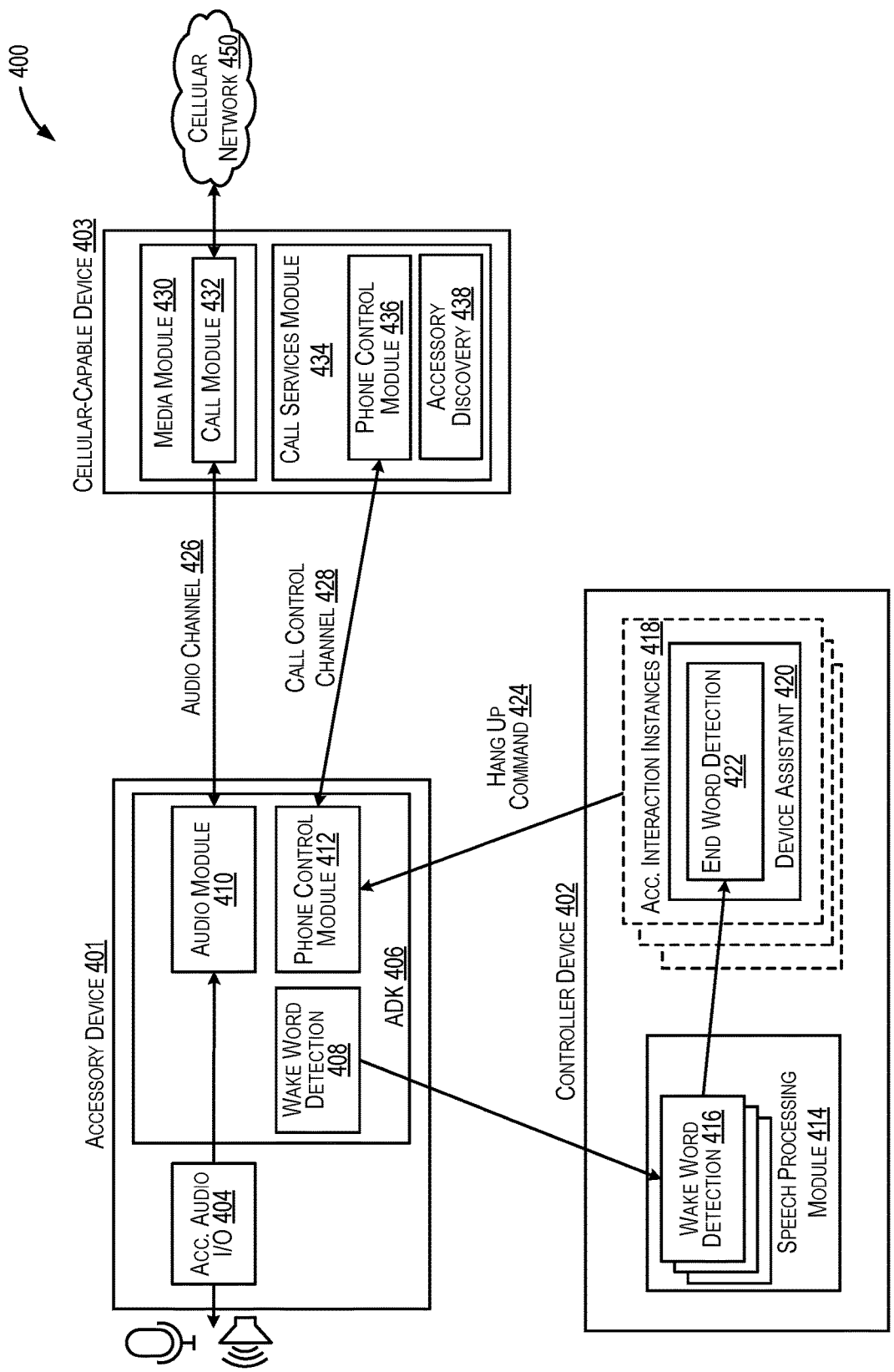
FIG. 4 is a simplified block diagram illustrating at least some techniques for communication between an accessory device and a cellular-capable device.

FIG. 4 is a simplified block diagram 400 illustrating at least some techniques for communicating between an accessory device 401 and a cellular-capable device 403 to place a phone call at the cellular-capable device 403. The diagram 400 includes some detailed architecture of representative devices as well as process flow arrows providing a general indication of the transfer of data or information. The process flow arrows are not intended to connote any specific architectural connections between the elements detailed herein. Each of the elements depicted in FIG. 4 may be similar to one or more elements depicted in other figures described herein. For example, the accessory device 401 may correspond to one or more of the accessories and accessory devices described herein, and so forth. In some embodiments, at least some of the elements in diagram 400 may operate within the context of a home environment like the home environment 200 of FIG. 2.

Turning to each element in further detail, accessory device 401 can have audio input and output functionality, including an accessory audio input/output ("I/O") 404. The accessory audio I/O 404 can include both hardware (e.g., speaker and microphone) and software/firmware necessary to provide audio input and output functionality. The accessory device 401 also comprises an ADK 406. The ADK 406 may be similar to the ADK 308 described above with respect to FIG. 3. The ADK can include a wake word detection module 408, an audio module 410, and a phone control module 412. The wake word detection module 408 can perform a first processing of a portion of an audio input corresponding to a trigger or wake word. The wake word detection module can itself contain information about wake words and triggers, including, for example, triggering criteria and audio patterns corresponding to specific wake words. The audio module 410 and phone control module 412 can be similar to phone audio module 310 and phone control module 312, respectively, as described with reference to FIG. 3. As shown by the process flow arrows, an audio input received at the accessory device 401 can be processed by the wake word detection module 408. If the wake word is detected, the accessory device can transmit the audio input to the controller device 402 for further processing. The accessory device 401 can continue to listen for the wake word during a phone call. Because the user will be speaking during the call, and the spoken audio transmitted from the audio module 410 to the cellular-capable device 403, the wake word detection module 408 can allow the accessory device to distinguish user phone audio from audio intended to convey a request or command of the accessory device.

The controller device can include a speech processing module 414 comprising wake word detection module 416. As depicted in FIG. 4, the wake word detection module 416 may have instances corresponding to each of the accessory interaction instances 418, such that each instance of the wake word detection module 416 is part of a separate software ecosystem at the controller device. The wake word detection module 416 can process the wake word audio at a second level that can confirm the presence of the wake word to a higher degree of probability than the wake word detection module 408 at the accessory device 401. If the speech processing module 414 does not detect the wake word, the controller device 402 can ignore the audio input. If the wake word is detected, then the audio input can be further processed at the accessory interaction instances 418.

The accessory interaction instances 418 can comprise a virtual device assistant 420. During normal operation, the controller device 402 can process the audio from a user request or other audio input that passes the wake word detection module 416 by having the accessory interaction instances 418 connect to a remote service and transmit a portion of the audio input to the remote service. NLP and other services used to process the audio input can comprise the remote service. During a call, however, the accessory interaction instance corresponding to accessory device 401 can be in a call listening state. In this state, the device assistant 420 may not process any other user audio except for an end word at end word detection module 422. In some embodiments, the end word detection module can operate entirely within the corresponding accessory interaction instance, such that the device assistant 420 does not transmit any of the phone call audio to a remote service or other device in the event that the wake word detection module 416 indicates that the wake word was heard. In other embodiments, the device assistant 420 can process only a limited portion of the audio input received after detecting the wake word. For example, the end word detection can process a short portion of audio sufficient to encompass end words "hang up" and "end call." If the end word is detected, the accessory interaction instance can transmit a hang up command 424 to the accessory device 401. The accessory device 401 can then signal to the cellular-capable device 403 to end the call and terminate the audio between the devices.

Cellular-capable device 403 can comprise a media module 430 that can be configured to send, receive, and process audio and video data. The media module can include a call module 432. The call module 432 can be configured to send, receive, and process the audio data of the phone call made via a cellular network 450 to which the cellular-capable device is connected. The call module 432 can transmit and receive audio data to and from the accessory device 401 over an audio channel 426, which can be a real-time audio channel using RTP or similar communication protocols. The cellular-capable device 403 can also comprise a call services module 434 that can be configured to perform processes including negotiating the phone call (e.g., dialing out) and receiving call instructions from the accessory device (e.g., terminate the call). The call services module 434 can include a phone control module 436 and an accessory discovery module 438. The phone control module 436 may be similar to the phone control module 322 of FIG. 3. The accessory discovery module 438 can allow the cellular-capable device 403 to discover and negotiate communications channels with accessory devices within the home environment. For example, in some embodiments, the cellular-capable device 403 may receive instructions from the controller device 402 to place a call and connect to accessory device 401. The accessory discovery module 438 can locate the accessory device 401 within one of the networks of the home environment and, in conjunction with phone control module 436, establish a communication connection with accessory device 401, including call control channel 428.

Figure 5:
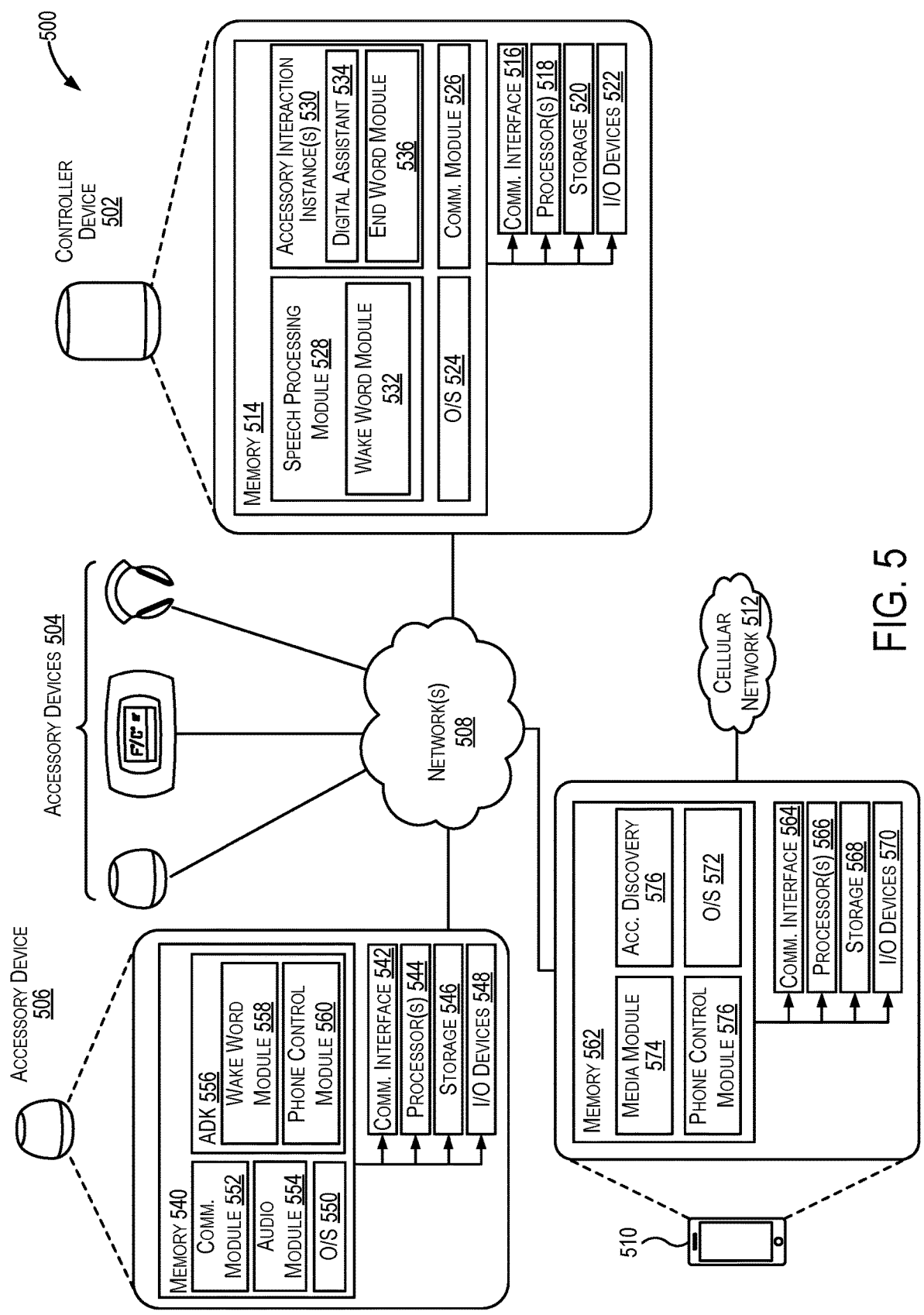
FIG. 5 is another simplified block diagram illustrating an example architecture of a system used to establish communications between an accessory device and a cellular capable device according to an embodiment.

FIG. 5 is a simplified block diagram 500 illustrating an example architecture of a system used to establish communications between an accessory device and a cellular capable device according to an embodiment. The diagram 500 includes a controller device 502, one or more accessory device 504, a representative accessory device 506, one or more network(s) 508, a cellular-capable device 510, and a cellular network 512. Each of these elements depicted in FIG. 5 may be similar to one or more elements depicted in other figures described herein. In some embodiments, at least some elements of diagram 500 may operate within the context of a home environment (e.g. the home environment 200 of FIG. 2).

The accessory devices 504 and representative accessory device 506 may be any suitable computing device (e.g., smart speaker, smartwatch, smart thermostat, camera, etc.). In some embodiments, the accessory devices 504, 506 may perform any one or more of the operations of accessory devices described herein. Depending on the type of accessory device and/or location of the accessory device (e.g., within the home environment or outside the home environment), the accessory device 506 may be enabled to communicate using one or more network protocols (e.g., a Bluetooth connection, a Thread connection, a Zigbee connection, a WiFi connection, etc.) and network paths over the network(s) 508 (e.g., including a LAN or WAN), described further herein.

In some embodiments, the controller device 502 may correspond to any one or more of the controller devices or hub devices described herein. For example, the controller device 502 may correspond to one or more of the hub devices of the home environment 200 of FIG. 2. The controller device may be any suitable computing device (e.g., a mobile phone, tablet, a smart hub speaker device, a smart media player communicatively connected to a TV, etc.).

In some embodiments the one or more network(s) 508 may include an Internet WAN and a LAN. As described herein, the home environment may be associated with the LAN, whereby devices present within the home environment may communicate with each other over the LAN. As described herein, the WAN may be external from the home environment. For example, a router associated with the LAN (and thus, the home environment) may enable traffic from the LAN to be transmitted to the WAN, and vice versa.

As described herein, controller device 502 may be representative of one or more controller devices or hub devices connected to one or more of the network(s) 508. The controller device 502 has at least one memory 514, a communications interface 516, one or more processing units (or processor(s)) 518, a storage unit 520, and one or more input/output (I/O) device(s) 522.

Turning to each element of controller device 502 in further detail, the processor(s) 518 may be implemented as appropriate in hardware, computer-executable instructions, firmware or combinations thereof. Computer-executable instruction or firmware implementations of the processor(s) 518 may include computer-executable or machine executable instructions written in any suitable programming language to perform the various functions described.

The memory 514 may store program instructions that are loadable and executable on the processor(s) 518, as well as data generated during the execution of these programs. Depending on the configuration and type of controller device 502, the memory 514 may be volatile (such as random access memory ("RAM")) or non-volatile (such as read-only memory ("ROM"), flash memory, etc.). In some implementations, the memory 514 may include multiple different types of memory, such as static random access memory ("SRAM"), dynamic random access memory ("DRAM") or ROM. The controller device 502 may also include additional storage 520, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 520 may be utilized to store data contents received from one or more other devices (e.g., other controller devices, cellular-capable device 510, accessory devices 504, or the representative accessory device 506).

The controller device 502 may also contain the communications interface 516 that allows the controller device 502 to communicate with a stored database, another computing device or server, user terminals, or other devices on the network(s) 508. The controller device 502 may also include I/O device(s) 522, such as for enabling connection with a keyboard, a mouse, a pen, a voice input device, a touch input device, a display, speakers, a printer, etc.

The memory 514 may include an operating system 524 and one or more application programs or services for implementing the features disclosed herein, including a communications module 526, a speech processing module 528, and accessory interaction instance(s) 530. The speech processing module 528 further comprises a wake word module 532 and the accessory interaction instance(s) 530 further comprise a digital assistant 534 and end word module 536.

The communications module 526 may comprise code that causes the processor(s) 518 to generate instructions and messages, transmit data, or otherwise communicate with other entities. For example, the communications module 526 may, in conjunction with the digital assistant 534, transmit and receive data associated with establishing a phone call to and from the accessory device 506 and cellular-capable device 510. As described herein, the communications module 526 may transmit messages via one or more network paths of network(s) 508 (e.g., via a LAN associated with the home environment or an Internet WAN).

The speech processing module 528 can comprise code that causes the processor(s) 518 to receive and process an audio input corresponding to a spoken request to place a call or end a call, according to some embodiments. Processing the spoken audio can include, for example, NLP or audio pattern matching. In some embodiments, one or more of the operations of speech processing module 528 may be similar to those described in reference to speech processing module 414 of FIG. 4. Wake word module 532 can comprise code that causes processor(s) 518 to receive and process a portion of an audio input corresponding to a trigger or wake word. In some embodiments, one or more of the operations of the wake word module 532 may be similar to those described in reference to wake word detection module 416 of FIG. 4. For example, wake word module 532 can analyze a portion of an audio input to determine the presence of a wake word.

The accessory interaction instance(s) 530 may comprise code that causes the processor(s) 518 to receive and process a portion of an audio input corresponding to a user request. In some embodiments, one or more of the operations of accessory interaction instance(s) 530 may be similar to those described in reference to accessory interaction instances 418 of FIG. 4. For example, the accessory interaction instance(s) 530 can comprise a number of processes or services that can cause the processor(s) 518 to send and receive data to a remote service, identify an appropriate cellular-capable device for placing a call according to the user request, or entering a call listening state that limits the functionality of a digital assistant 534 while the call is ongoing. The accessory interaction instance(s) 530 may comprise the digital assistant 534 that can perform one or more of these example operations as well as additional operations related to the interaction between the accessory devices 504, 506 and the cellular-capable device 510 as described herein. The accessory interaction instance(s) 530 may also comprise an end word module 536. When in the call listening state, the accessory interaction instance corresponding to the accessory device on the call may limit the speech processing functionality of its digital assistant 534 to only detect a call end word (e.g., "hang up"). In those cases, the end word module 536 can receive, after processing at the wake word module 532, an audio input. The end word module 536 can process this audio input to detect the end word. In some embodiments, the end word module 536 performs the speech analysis similarly to the wake word module 532. When the end word is detected, the digital assistant 534, in conjunction with the communication module 526, can send an instruction to the accessory device to end the call.

Turning now to the details of the representative accessory device 506, the accessory device 506 can have, in some embodiments, at least one memory 540, a communications interface 542, processor(s) 544, a storage unit 546, and I/O devices 548. As described herein with respect to the controller device 502, these elements of the accessory device can have the same appropriate hardware implementations as their counterparts on the controller device 502.

The memory 540 of the accessory device 506 can include an operating system 550 and one or more application programs or services for implementing the features disclosed herein, including communications module 552, audio module 554, and ADK 556. As described herein with respect to the controller device 502, the communications module 552 can have similar appropriate functionality as its counterpart communications module 526.

The audio module 554 may comprise code that causes the processor(s) 544, in conjunction with the I/O devices 548, to receive, process, and transmit audio signals. In some embodiments, one or more of the operations of the audio module may be similar to those described in reference to accessory audio module 410 of FIG. 4. For example, the audio module 554 can receive a user utterance or other audio input at a microphone with the I/O devices 548 and transmit that audio data to the controller device 502 over a streaming audio channel or other suitable connection. The audio input can correspond to a wake word in conjunction with an end word. The audio module 554 can also receive user audio at the microphone and relay that audio to the cellular-capable device as part of the phone call. Similarly, the audio module can receive audio from the cellular-capable device and play that audio at the speaker.

The ADK 556 may comprise code that causes the processor(s) 544 to receive and process a portion of an audio input corresponding to a trigger or wake word. In some embodiments, one or more of the operations of the ADK 556 may be similar to those described in reference to ADK 406 of FIG. 4. The ADK 556 can comprise a wake word module 558. Wake word module 558 can comprise code that causes processor(s) 544 to receive and process the wake word. In some embodiments, one or more of the operations of the wake word module 558 may be similar to those described in reference to wake word detection module 408 of FIG. 4. For example, wake word module 558 can analyze a portion of an audio input to determine the presence of a wake word.

In some embodiments, the ADK 556 can also include a phone control module 560. The phone control module 560 may comprise code that causes processor(s) 544 to send and receive commands and indications to and from cellular-capable device 510. For example, upon receiving an audio input containing the end word, the controller device 502 can transmit instructions to the accessory device 506 to end the call. The accessory device 506, via its phone control module 560, can then signal the cellular-capable device 510 to end the call and close the audio connection between the two devices.

Turning now to the details of cellular-capable device 510, similar to the other device architectures diagrammed in FIG. 5, cellular-capable device 510 can have, in some embodiments, at least one memory 562, a communications interface 564, processor(s) 566, a storage unit 568, and I/O devices. As described herein with respect to the controller device 502, these elements of the accessory device can have the same appropriate hardware implementations as their counterparts on the controller device 502.

The memory 562 of the cellular-capable device 510 can include an operating system 572 and one or more application programs or services for implementing the features disclosed herein, including media module 574, phone control module 576, and accessory discovery module 576. As described herein with respect to the accessory device 506, the phone control module 576 can have similar appropriate functionality as its counterpart phone control module 560.

The media module 574 may comprise code that causes the processor(s) 566 to send, receive, and process data contained in a telephone call. This data can be received from and transmitted to a server device or other device connected to a cellular network 512. The media module 574 can also send, receive, and process data corresponding to the real-time audio of the phone call sent over one of the network(s) 508 to the accessory device 506. In some embodiments, one or more of the operations of media module 574 may be similar to those described in reference to media module 430 of FIG. 4.

The accessory discovery module 576 may comprise code that causes the processor(s) 566 to receive information about the selected accessory device 506 on one of the network(s) 508 within the home environment to establish a communications channel for purposes of directing a call at the cellular-capable device 510 from the accessory device 506. In some embodiments, one or more of the operations of accessory discovery module 576 may be similar to those described in reference to accessory discovery module 438 of FIG. 4.

Figure 6:
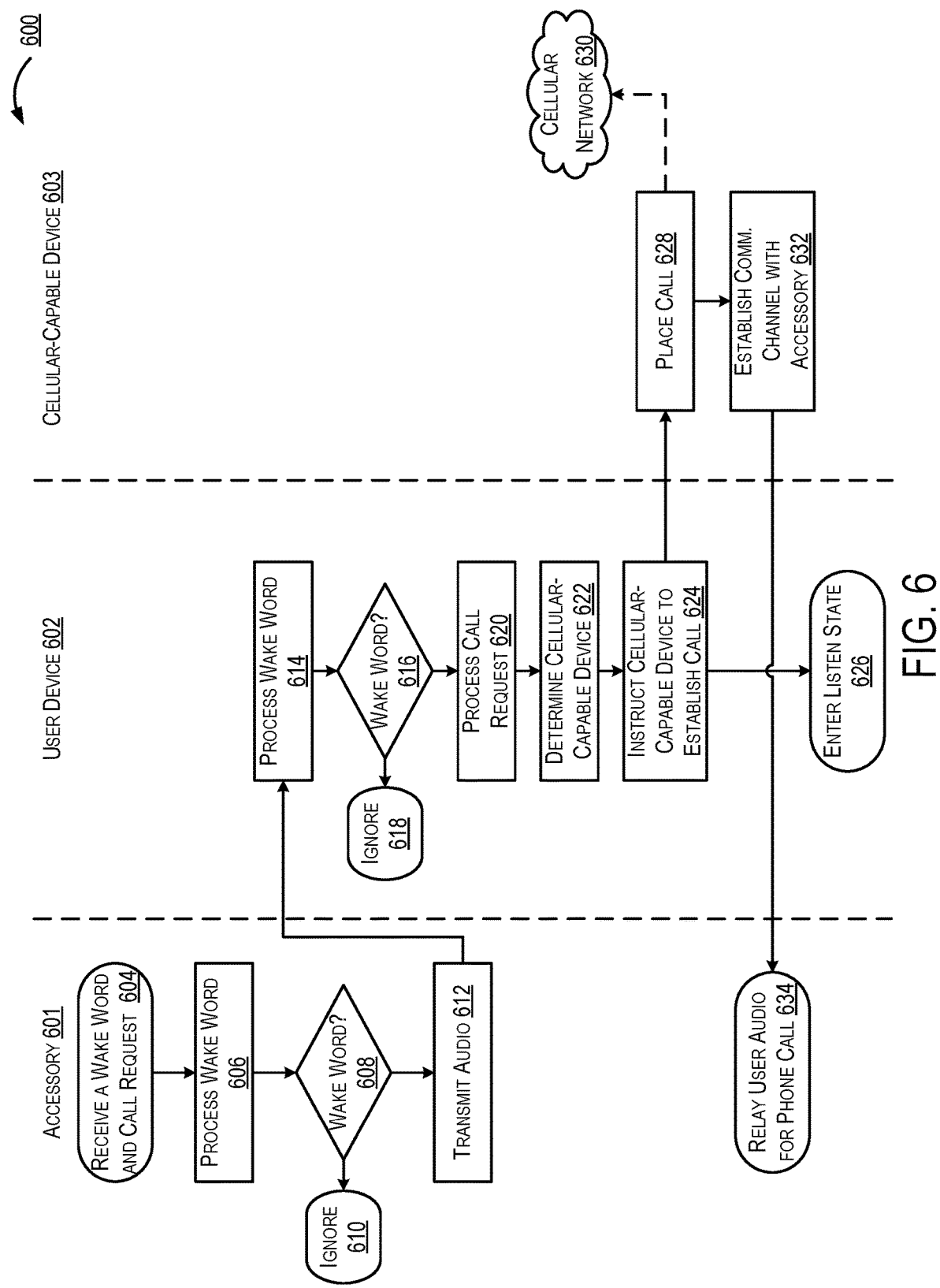
FIG. 6 is another flow diagram illustrating an example process for requesting a phone call at an accessory device and placing that phone call at a cellular-capable device, according to an embodiment.

FIG. 6 is a flow diagram illustrating a particular example process 600 for requesting a phone call at an accessory 601 and placing that phone call at a cellular-capable device 603, according to an embodiment. Each of the elements and operations depicted in FIG. 6 may be similar to one or more elements depicted in other figures described herein. For example, the user device 602 may be similar to other user devices, controller devices, or hub devices, and so forth. In some embodiments, process 600 may be performed within a home environment (e.g. the home environment 200 of FIG. 2).

Process 600, as well as processes 700 and 800 of FIGS. 7 and 8 (described below) are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

At block 604, the accessory 601 can receive an audio input containing a wake word and a call request. For example, the audio input may be the user utterance "Computer, call Mom," where "Computer" comprises the wake word and "call Mom" comprises the request.

At block 606, the accessory 601 can process the wake word in a first pass to determine the presence of the wake word. The first pass processing can be done in a time and resource efficient manner that determines that the wake word may be present. At decision 608, based upon the first pass processing, the accessory 601 determines if the wake word is present. If not, then the process can terminate at endpoint 610 by ignoring the user utterance. If the wake word is present according to the first pass processing, then the process continues to block 612.

At block 612, the accessory 601 can transmit the audio input via a streaming audio connection to user device 602. This connection can occur over one of the networks to which the accessory 601 and user device 602 are connected, for example over a WiFi LAN. The streaming audio can use any number of methods or protocols, including, but not limited to AirPlay, Real-time Transport Protocol ("RTP"), Real Time Streaming Protocol (RTSP), or the like.

At block 614, the user device 602 receives the wake word and can process it for a second pass. This processing can be at a second level that can confirm the presence of the wake word to a higher degree of probability than the first pass processing at block 606 at the accessory 601. At decision 616, if the user device 602 does not confirm the presence of the wake word, the process moves to endpoint 618 and ignores the audio input by terminating the streaming audio connection with the accessory 601. If the user device 602 does confirm the presence of the wake word, then the process moves to block 620 and processes the call request. In processing the call request, the user device 602 can transmit some or all of the call request to a remote server device for speech analysis using NLP or other techniques. This analysis may determine the user making the call request. In identifying the user, the user device 602 or the remote service device may access user profiles associated with users in the home environment. These user profiles may be stored at the user device 602 or at the remote service device or other device accessible by the device performing the speech analysis. Processing the call request can ultimately result in identifying a call recipient (e.g., Mom). The call recipient may be a telephone number associated with the name or other label spoken by the user making the call request. In some embodiments, the call recipient may be identifiable by the cellular-capable device 603 such that the portion of the call request identifying the recipient is sent to the cellular-capable device 603 with the instructions to place the call.

At block 622, the user device 602 can determine an appropriate cellular-capable device for making the call. This determination can be based upon information obtained about the requesting user from a user profile. In some embodiments, the appropriate cellular-capable device 603 may be the user's personal cellular phone. At block 624, the user device 602 can instruct the cellular-capable device to establish the call. This can include sending the cellular-capable device 603 information identifying the call recipient and identifying the accessory 601 to which the cellular-capable device 603 should connect to relay the call audio. Although not depicted in FIG. 6, in some embodiments the user device 602 can alternatively instruct the accessory 601 to communicate with the selected cellular-capable device 603 and instruct the cellular-capable device 603 to place the call. This scenario may occur in an environment where the user device 602 can identify the appropriate cellular-capable device 603 but is unable to communicate with it, for example because the devices do not have a trusted connection with one another. The user device 602 may then enter a call listening state at endpoint 626. While in the call listening state, the accessory interaction instance corresponding to accessory 601 at user device 602 can have limited speech processing with regard to analyzing received user requests from accessory 601. Other accessory interaction instances corresponding to different accessories associated with user device 602 may process user requests at those accessories as per normal.

At block 628, the cellular-capable device 603 can place a call to the call recipient via cellular network 630. At block 632, the cellular-capable device 603 can establish an audio channel with the accessory 601. The accessory 601 can then begin relaying audio to and from the cellular-capable device 603 to constitute the phone conversation. While the call is ongoing, the user device 602 may stay in the listening state at block 626, in order to listen for an "end" word to terminate the call. However, in other examples, the accessory 601 may be configured to also (or instead of the user device 602) be in a listening state, in order to listen for the "end" word to terminate the call, or for other instructions (e.g., potentially, not related to the phone call). While both devices (e.g., the accessory 701 and the user device 702) may be capable of listening for the "end" word, the user device 702 may be better suited for this task based on the fact that the detectors on the accessory 701 may be poor in comparison to those of the user device 702.

Figure 7:
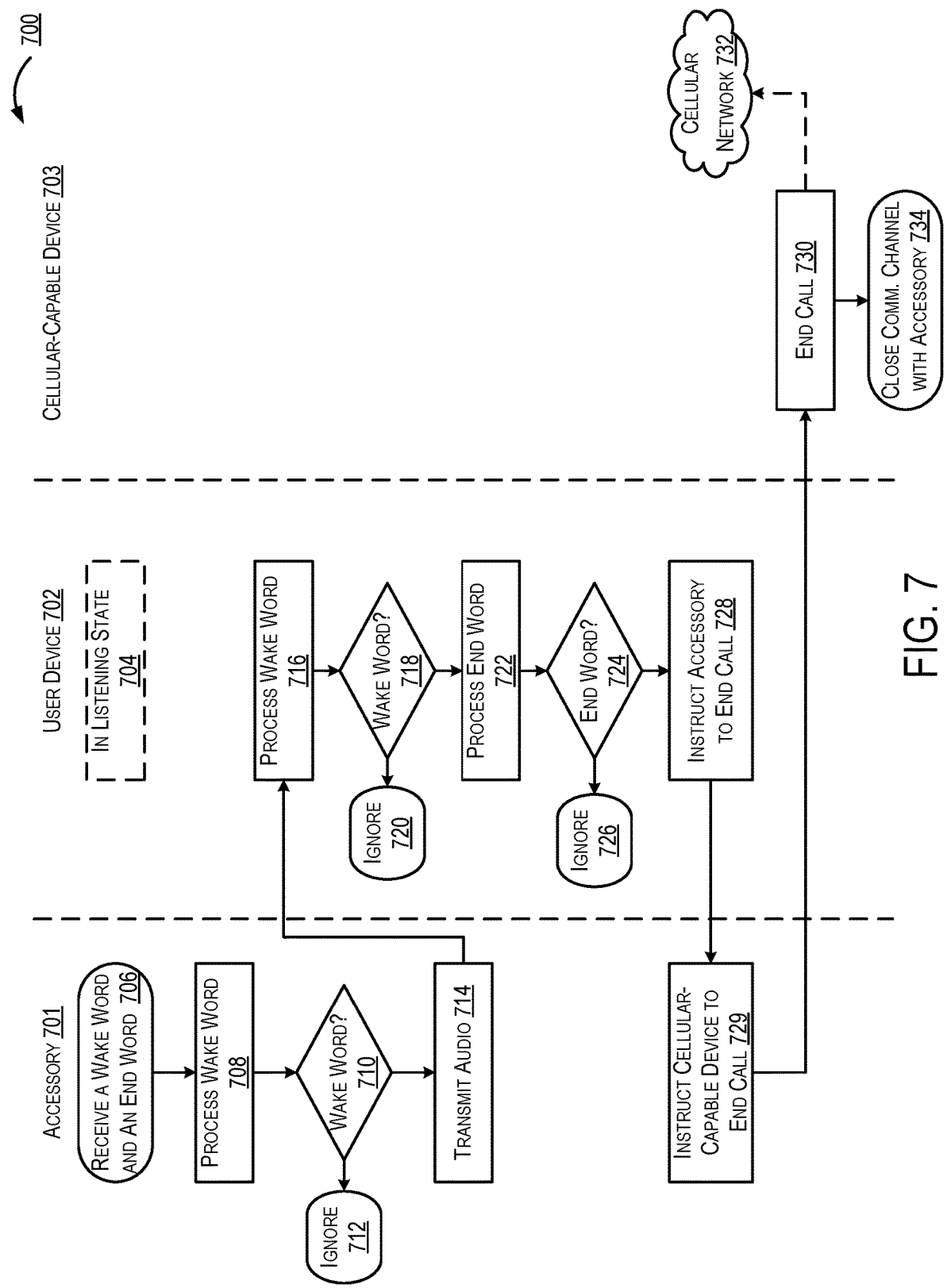
FIG. 7 is another flow diagram illustrating an example process for requesting the termination of a phone call at an accessory device and ending the call at a cellular-capable device, according to an embodiment.

FIG. 7 is another flow diagram illustrating an example process 700 for requesting the termination of a phone call at an accessory device 701 and ending the call at a cellular-capable device 703, according to an embodiment. Each of the elements and operations depicted in FIG. 7 may be similar to one or more elements depicted in other figures described herein. Process 700 can, in some embodiments, be a continuation of process 600 described in FIG. 6, above. Thus, accessory 701 may correspond to accessory 601, user device 702 may correspond to user device 602, and cellular-capable device 703 may correspond to cellular-capable device 603.

While a call is ongoing between the cellular capable device 703 and one of its associated accessories (e.g., accessory 701), user device 702 begins process 700 in a call listening state 704. The call listening state may be similar to the listening state described for endpoint 626 of FIG. 6, in some embodiments. Alternatively, the accessory 701 may also be in a listening state (both for the wake word and/or for and "end" word). Accessory 701 can receive a user audio input at block 706. The audio input can consist of a wake word and an end word, for example "Computer, hang up." The accessory 701 can process the wake word and transmit the audio input to user device 702 for further processing in blocks 708-720. In some embodiments, one or more of the operations of blocks 708-720 may be similar to one or more operations described for blocks 606-618 in reference to FIG. 6.

At block 718, if the user device 702 detects the wake word, it can then process the end word portion of the audio input, at block 722. The processing of the end word may be limited to only detecting and processing a specific end word (e.g., "hang up") or small set of equivalent words (e.g., "end call," "end," etc.). At decision 724, if the end word is not detected, the user device 702 will ignore the audio input, and the process will end at endpoint 726. Because the user device 702 is in the call listening state (e.g., at block 704), it will ignore all audio inputs that do not contain the end word, even if the inputs otherwise contain valid and determinable requests. In many embodiments, the user device 702 may not process any portion of the audio input beyond the portion sufficient to contain the expected end word if the end word is not detected in that sufficient portion. In this way, the user device 702 is not able to listen in on the call and/or record any portion of the call.

At block 728, if the end word is detected, the user device 702 can instruct the accessory 701 to end the call. The accessory, at block 729, receives the instruction and communicates with the cellular-capable device 703 to terminate the call. Alternatively, in some examples, the user device 702 may instead instruct the cellular-capable device 703 to end the call at block at 728. In this example, block 729 would be skipped, and the cellular-capable device 703 would be instructed to end the call without going through the accessory 701. At block 730, the cellular-capable device 703 can terminate the call connection with the cellular network 732 and then close the communication channel with the accessory 701, at endpoint 734.

Figure 8:
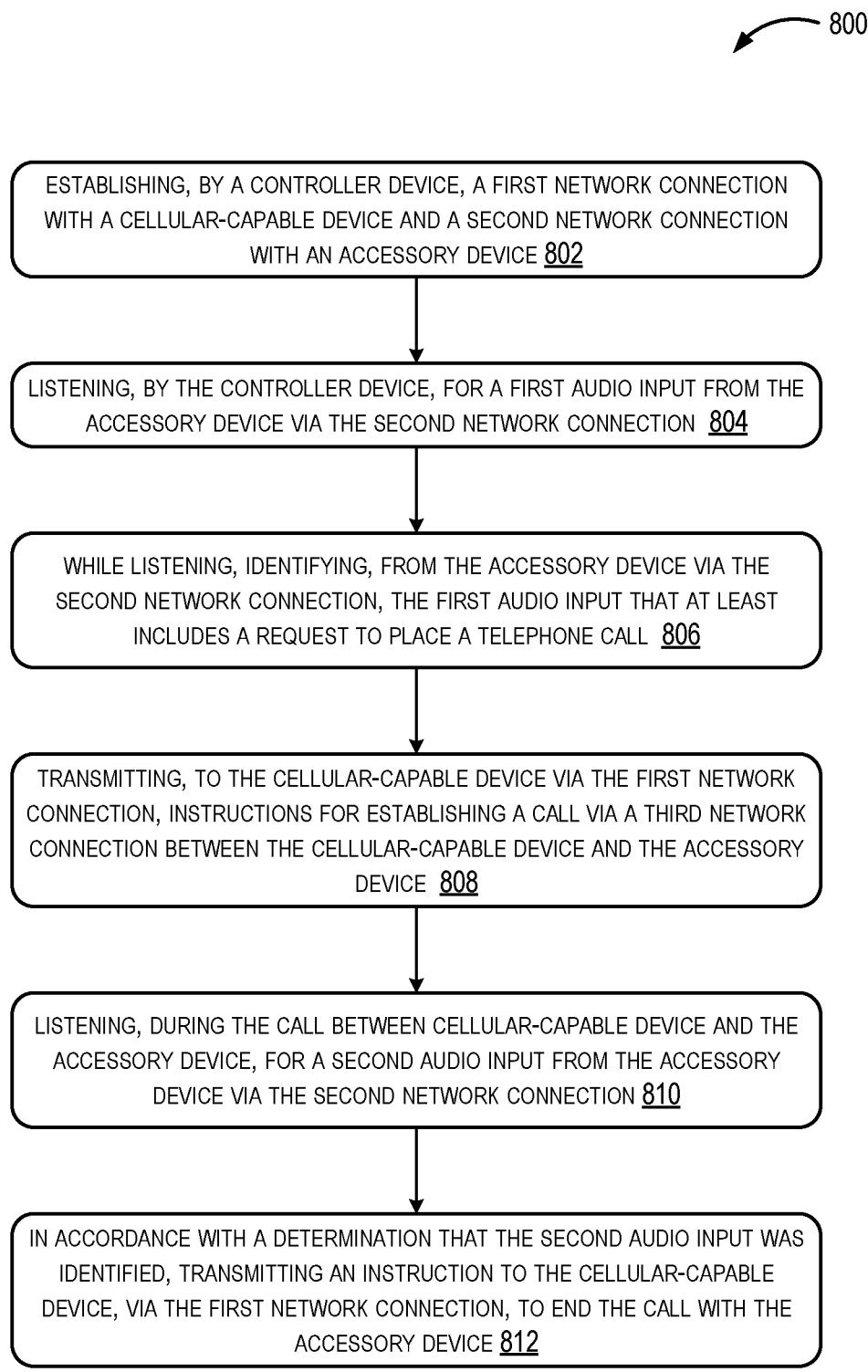
FIG. 8 is a flow diagram showing a process for a user device to establish a connection between an accessory device and cellular-capable device, according to some embodiments.

FIG. 8 is a flow diagram showing a process 800 for a controller device to establish a connection between an accessory device and cellular-capable device, according to some embodiments. In some embodiments, one or more of the operations of process 800 may be similar to those as described in reference to FIGS. 6 and 7.

At block 802, a controller device may establish a first network connection with a cellular-capable device and a second network connection with an accessory device. The network connections can occur over one or more of the networks associated with a home environment. In the case of the accessory device, the second network connection can be the network connection over which the controller device communicates with the accessory device when responding to user requests at the accessory device. In some embodiments, one or more of the operations of block 802 may be similar to one or more operations described for process indicators 330 and 340 in reference to FIG. 3.

At block 804, the controller device can listen for an audio input from the accessory device over the second network connection. This listening behavior is the typical state of a controller device acting as a hub device for one or more associated accessories. When the accessory receives an audio input that contains a trigger or a wake word, the accessory can transmit that audio input to its associated hub device for further processing.

At block 806, the controller device can receive an audio input from the accessory device over the second network connection. The audio input can contain a wake word and a call request. The call request can correspond to a request for a cellular-capable device to make a telephone call. In some embodiments, one or more of the operations of block 806 may be similar to one or more operations described for block 620 in reference to FIG. 6.

At block 808, upon receiving the call request, the controller device can transmit instructions to the cellular-capable device over the first network connection for the cellular-capable device to establish a third network connection with the accessory device and place a call. In some embodiments, one or more of the operations of block 808 may be similar to one or more operations described for block 624 in reference to FIG. 6.

At block 810, the controller device can enter a call listening state. While in this state, the controller device can listen for a second audio input from the accessory device. In some embodiments, one or more of the operations of block 810 may be similar to one or more operations described for blocks 716 and 722 in reference to FIG. 7.

At block 812, if the controller device identifies an end word in the second audio input, then the controller device can transmit instructions to the cellular-capable device to end the call and close the connection with the accessory device. In some embodiments, one or more of the operations of block 812 may be similar to one or more operations described for process indicator 340 in reference to FIG. 3.

Illustrative techniques for communicating between an accessory device and a cellular-capable device are described above. Some or all of these techniques may, but need not, be implemented at least partially by architectures such as those shown at least in FIGS. 1-8 above. While many of the embodiments are described above with reference to server devices, accessory devices, user devices, and hub devices, it should be understood that other types of computing devices may be suitable to perform the techniques disclosed herein. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

Although specific example embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

As described above, one aspect of the present technology is the gathering and use of data available from specific and legitimate sources to improve the delivery to users of invitational content or any other content that may be of interest to them when updating firmware. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, and exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

The various embodiments further can be implemented in a wide variety of operating environments, which in some cases can include one or more user computers, computing devices or processing devices that can be used to operate any of a number of applications. User or client devices can include any of a variety of different types of computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, SAP®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory ("EEPROM"), flash memory or other memory technology, CD-ROM, DVD or other optical storage, magnetic cassettes, magnetic tape, magnetic disk storage or other magnetic storage devices or any other medium that can be used to store the desired information and that can be accessed by the a system device. Based at least in part on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based at least in part on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode. Variations of those preferred embodiments may become apparent to those of ordinary skill in the art upon reading the foregoing description. It is expect that skilled artisans should be able to employ such variations as appropriate, it is intended for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method, comprising:
 establishing, by a controller device, a first network connection with a cellular-capable device and a second network connection with an accessory device;
 listening, by the controller device, for a first audio input from the accessory device via the second network connection;
 while listening, identifying, from the accessory device via the second network connection, the first audio input that at least includes a request to place a telephone call;
 transmitting, to the cellular-capable device via the first network connection or to the accessory device via the second network connection, instructions for establishing a call via a third network connection between the cellular-capable device and the accessory device;
 listening, during the call between the cellular-capable device and the accessory device, for a second audio input from the accessory device via the second network connection; and
 in accordance with a determination that the second audio input was identified, transmitting an instruction, to the cellular-capable device via the first network connection or to the accessory device via the second network connection, to end the call with the accessory device.

2. The method of claim 1, wherein the second audio input comprises an end word configured to identify that the call is to be ended.

3. The method of claim 2, wherein, during the call, the controller device only listens for the end word.

4. The method of claim 2, wherein, during the call, the controller device does not process any audio received from the accessory device via the second network connection other than the end word.

5. The method of claim 2, wherein the end word comprises at least one of "hang up," or "end call".

6. The method of claim 1, further comprising:
 in accordance with the determination that the second audio input was identified, transmitting information to the accessory device, via the second network connection, that informs the accessory device that the call is to be ended.

7. The method of claim 1, wherein the first audio input further includes at least a wake word.

8. The method of claim 7, wherein the wake word indicates that a second portion of the first audio input identifies an action for the controller device to perform.

9. The method of claim 8, wherein the action comprises the transmission of the instructions for establishing the call via the third network connection.

10. The method of claim 7, wherein the wake word corresponds to a first software ecosystem of the controller device, and does not correspond to a second software ecosystem of the accessory device.

11. The method of claim 1, wherein the accessory device is a third-party device that is built for a first entity that is different from a second entity for which the controller device is built.

12. The method of claim 11, wherein the accessory device is configured to implement a software development kit provided by the second entity associated with the controller device.

13. A computer-readable storage medium configured to store computer-executable instructions that, when executed by a controller device, cause the controller device to perform operations comprising:
 establishing a first network connection with a cellular-capable device and a second network connection with an accessory device;
 listening for a first audio input from the accessory device via the second network connection;
 while listening, identifying, from the accessory device via the second network connection, the first audio input that at least includes a request to place a telephone call;
 transmitting, to the cellular-capable device via the first network connection or to the accessory device via the second network connection, instructions for establishing a call via a third network connection between the cellular-capable device and the accessory device;
 listening, during the call between the cellular-capable device and the accessory device, for a second audio input from the accessory device via the second network connection; and
 in accordance with a determination that the second audio input was identified, transmitting an instruction, to the cellular-capable device via the first network connection or to the accessory device via the second network connection, to end the call with the accessory device.

14. The computer-readable storage medium of claim 13, wherein the accessory device is not cellular capable.

15. The computer-readable storage medium of claim 1, wherein the accessory device is configured with a speaker and a microphone.

16. A controller device, comprising:
 a memory configured to store computer-executable instructions; and
 a processor configured to access the memory and execute the computer-executable instructions to at least:
  establish a first network connection with a cellular-capable device and a second network connection with an accessory device;
  listen for a first audio input from the accessory device via the second network connection;
  while listening, identify, from the accessory device via the second network connection, the first audio input that at least includes a request to place a telephone call;
  transmit, to the cellular-capable device via the first network connection or to the accessory device via the second network connection, instructions for establishing a call via a third network connection between the cellular-capable device and the accessory device;
  listen, during the call between the cellular-capable device and the accessory device, for a second audio input from the accessory device via the second network connection; and
  in accordance with a determination that the second audio input was identified, transmit an instruction, to the cellular-capable device via the first network connection or to the accessory device via the second network connection, to end the call with the accessory device.

17. The controller device of claim 16, wherein the cellular-capable device is configured to relay the call from a service provider to the accessory device.

18. The controller device of claim 16, wherein the controller device is one of a plurality of hub devices in a home environment.

19. The controller device of claim 16, wherein the computer-executable instructions are further executed to: transmit information to the accessory device, via the second network connection, that informs the accessory device that the call is to be ended in accordance with the determination that the second audio input was identified.

20. The controller device of claim 16, wherein the first audio input further includes at least a wake word, wherein the wake word indicates that a second portion of the first audio input identifies an action for the controller device to perform, and wherein the action comprises the transmission of the instructions for establishing the call via the third network connection.

* * * * *